US012800281B2

(12) United States Patent
Lai

(10) Patent No.: US 12,800,281 B2
(45) Date of Patent: Nov. 17, 2026

(54) MEASURING WHEEL

(71) Applicant: TOP MEASURE INSTRUMENT COMPANY, Taichung City (TW)

(72) Inventor: Yin-Wu Lai, Taichung City (TW)

(73) Assignee: TOP MEASURE INSTRUMENT COMPANY, Taichung City (TW)

( * ) Notice: Subject to any disclaimer, the term of this patent is extended or adjusted under 35 U.S.C. 154(b) by 379 days.

(21) Appl. No.: 18/604,266

(22) Filed: Mar. 13, 2024

(65) Prior Publication Data

US 2025/0290738 A1 Sep. 18, 2025

(51) Int. Cl.
*G01B 3/12* (2006.01)

(52) U.S. Cl.
CPC .................................... *G01B 3/12* (2013.01)

(58) Field of Classification Search
CPC ........ G01B 3/12; B25B 23/0021; G01C 22/00
USPC .......................................................... 33/782
See application file for complete search history.

(56) References Cited

U.S. PATENT DOCUMENTS 7,574,815 B1 * 8/2009 Lai .......................... G01B 3/12 33/772
10,119,800 B2 * 11/2018 Wang ...................... G01B 3/12
2006/0156573 A1 * 7/2006 Huang .................... G01B 3/12 33/772
2008/0148591 A1 * 6/2008 Kao Lin ................. G01B 3/12 33/772
2009/0217542 A1 * 9/2009 Watkins ................. A63C 19/06 33/775
2011/0180626 A1 * 7/2011 Kang .................. A63C 19/065 138/155
2013/0133212 A1 * 5/2013 Lai .......................... G01B 3/12 33/203
2013/0133217 A1 * 5/2013 Lai .......................... G01B 3/12 33/782
2017/0370687 A1 * 12/2017 Lai .......................... G01B 3/12
2018/0058831 A1 * 3/2018 Lai .......................... G01B 3/12
2024/0142210 A1 * 5/2024 Lai ......................... G01B 5/043
2024/0317561 A1 * 9/2024 Lai .......................... B66F 15/00
(Continued)

FOREIGN PATENT DOCUMENTS

CN 201083481 Y 7/2008
TW M317563 U 8/2007
(Continued)

*Primary Examiner* — Peter J Macchiarolo
*Assistant Examiner* — Anna Josephine Saunders
(74) *Attorney, Agent, or Firm* — patenttm.us

(57) ABSTRACT

A measuring wheel has a body, a distance wheel, a measuring module, an upper transmission group, a lower transmission group, and a linking group. The body has a handle, a wheel fork, and an operating shaft. The distance wheel is disposed on the wheel fork. The measuring module is disposed in the handle. The upper transmission group is disposed in the handle, is connected to the measuring module, and has an upper engaging gear. The lower transmission group is disposed in the wheel fork, is connected to the distance wheel, and has a lower engaging gear. The linking group is disposed in the operating shaft and has a linking shaft, an upper connecting element, a lower connecting element, and an elastic element. The two connecting elements are connected to and synchronously rotated with the linking shaft, and respectively engage with the two engaging gears.

9 Claims, 10 Drawing Sheets

(56) References Cited

U.S. PATENT DOCUMENTS

| | | | | |
|---|---|---|---|---|
| 2025/0290738 | A1* | 9/2025 | Lai | G01B 3/12 |
| 2025/0305807 | A1* | 10/2025 | Lai | G01B 3/12 |

FOREIGN PATENT DOCUMENTS

| | | | | |
|---|---|---|---|---|
| TW | M656101 | U | 5/2024 | |
| WO | WO-2024226894 | A2 * | 10/2024 | G01C 22/00 |

* cited by examiner

MEASURING WHEEL

BACKGROUND OF THE INVENTION

1. Field of the Invention

The present invention relates to a measuring wheel, and more particularly relates to a measuring wheel that can be easily and conveniently read by a user.

2. Description of Related Art

A conventional measuring wheel is a measuring equipment widely used in construction sites and roads and has a distance wheel and a measuring module. The measuring module is connected to the distance wheel, is used to measure a rotating distance of the distance wheel, and has a counter to record the number of revolutions when the distance wheel rotates. A user can calculate the rotating distance of the distance wheel by matching the number of revolutions recorded above with the diameter of the distance wheel.

The measuring module of the conventional measuring wheel is disposed adjacent to the distance wheel. There are fewer transmission structures between the distance wheel and the measuring module, and the transmission is relatively stable, which can maintain low measurement errors. However, the measuring module is disposed adjacent to the distance wheel, and a user needs to squat down to shorten a distance between the user's eyes and the measuring module to determine and read the value displayed by the measuring module, and this is inconvenient in use.

Therefore, the present invention provides a measuring wheel to mitigate or obviate the aforementioned problems.

SUMMARY OF THE INVENTION

The main objective of the present invention is to provide a measuring wheel that can be easily and conveniently read by a user.

The measuring wheel in accordance with the present invention has a body, a distance wheel, a measuring module, an upper transmission group, a lower transmission group, and a linking group. The body has a handle, a wheel fork, and an operating shaft. The distance wheel is disposed on the wheel fork. The measuring module is disposed in the handle. The upper transmission group is disposed in the handle, is connected to the measuring module, and has an upper engaging gear. The lower transmission group is disposed in the wheel fork, is connected to the distance wheel, and has a lower engaging gear. The linking group is disposed in the operating shaft and has a linking shaft, an upper connecting element, a lower connecting element, and an elastic element. The two connecting elements are connected to and synchronously rotated with the linking shaft, and respectively engage with the two engaging gears. The elastic element pushes the two connecting elements respectively toward and abutted against the two engaging gears.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
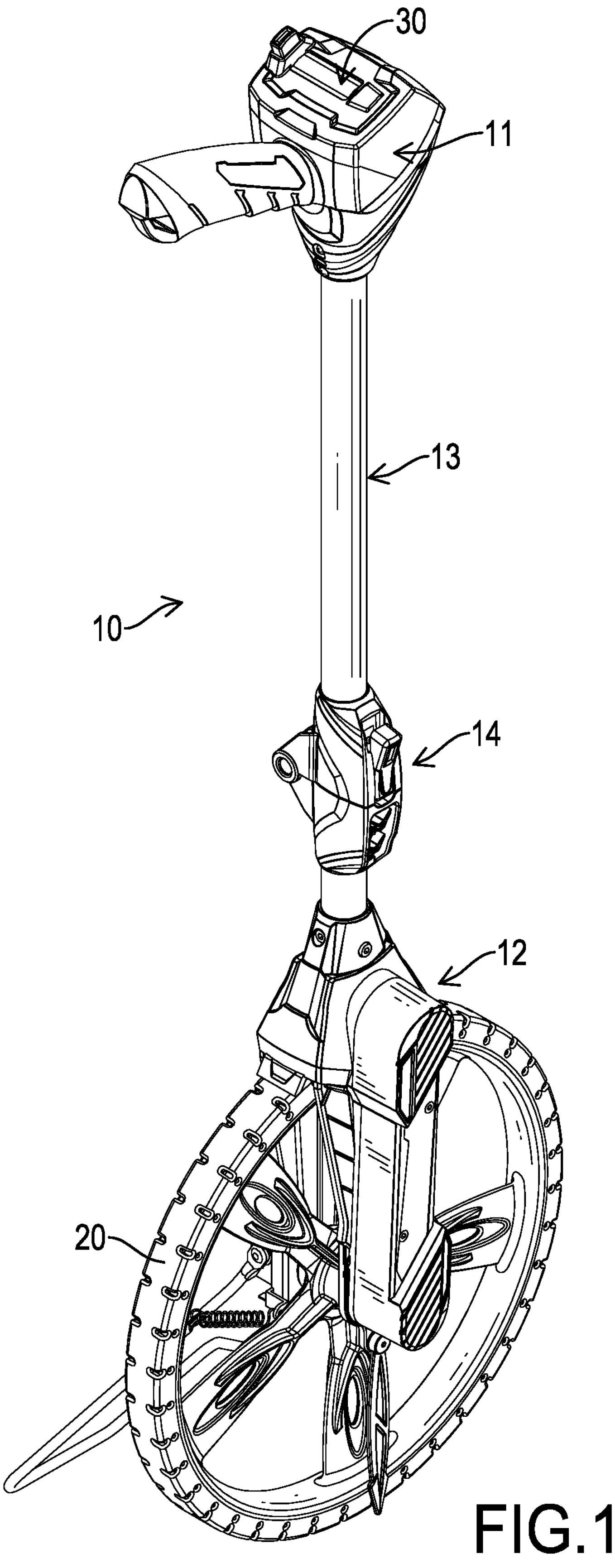
FIG. 1 is a perspective view of a measuring wheel in accordance with the present invention.
Figure 2:
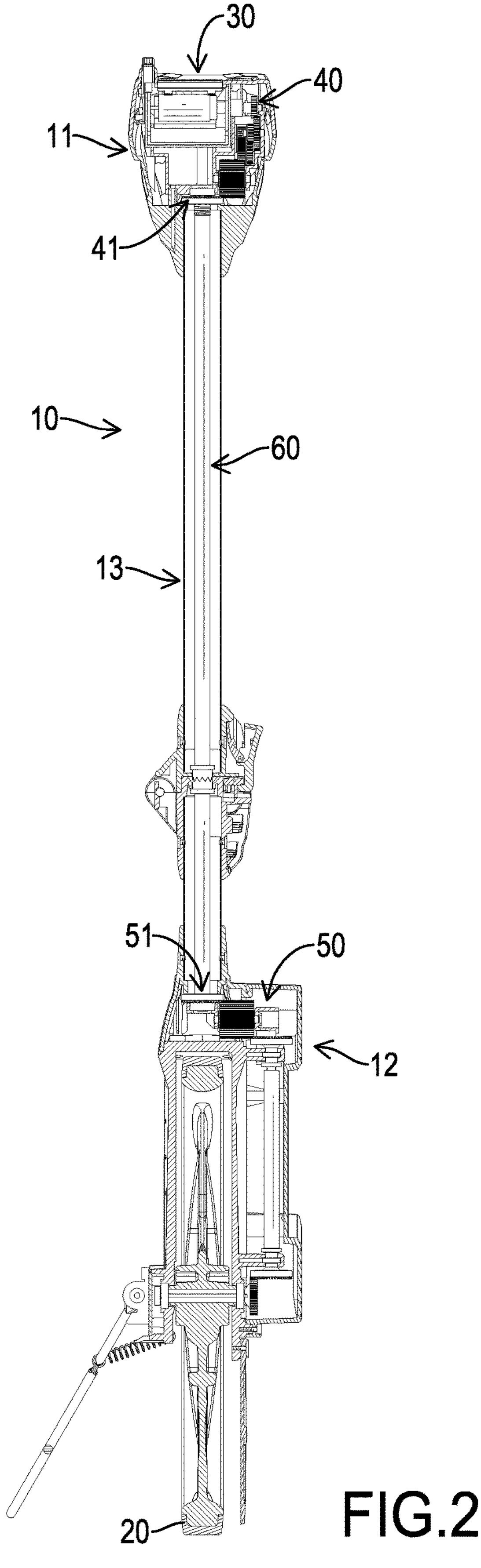
FIG. 2 is a side view in partial section of the measuring wheel in FIG. 1.

With reference to FIGS. 1 and 2, a measuring wheel in accordance with the present invention has a body 10, a distance wheel 20, a measuring module 30, an upper transmission group 40, a lower transmission group 50, and a linking group 60. The distance wheel 20 is disposed on a bottom of the body 10, and the measuring module 30 is disposed on a top of the body 10. Furthermore, the upper transmission group 40, the lower transmission group 50, and the linking group are disposed in the body 10 and are transmitted with each other between the distance wheel 20 and the measuring module 30.

Figure 3:
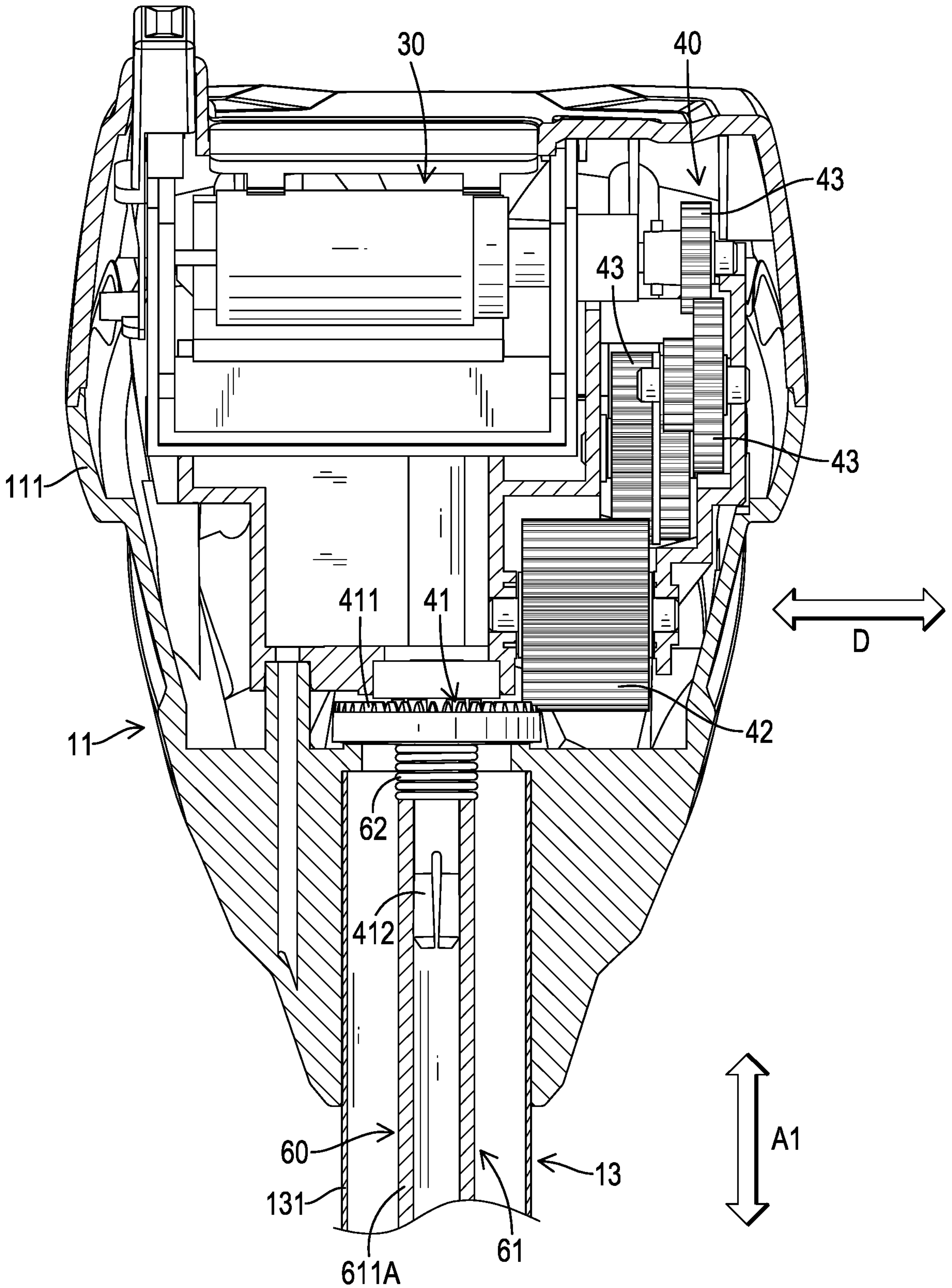
FIG. 3 is an enlarged side view in partial section of an upper transmission group of the measuring wheel in FIG. 1.
Figure 4:
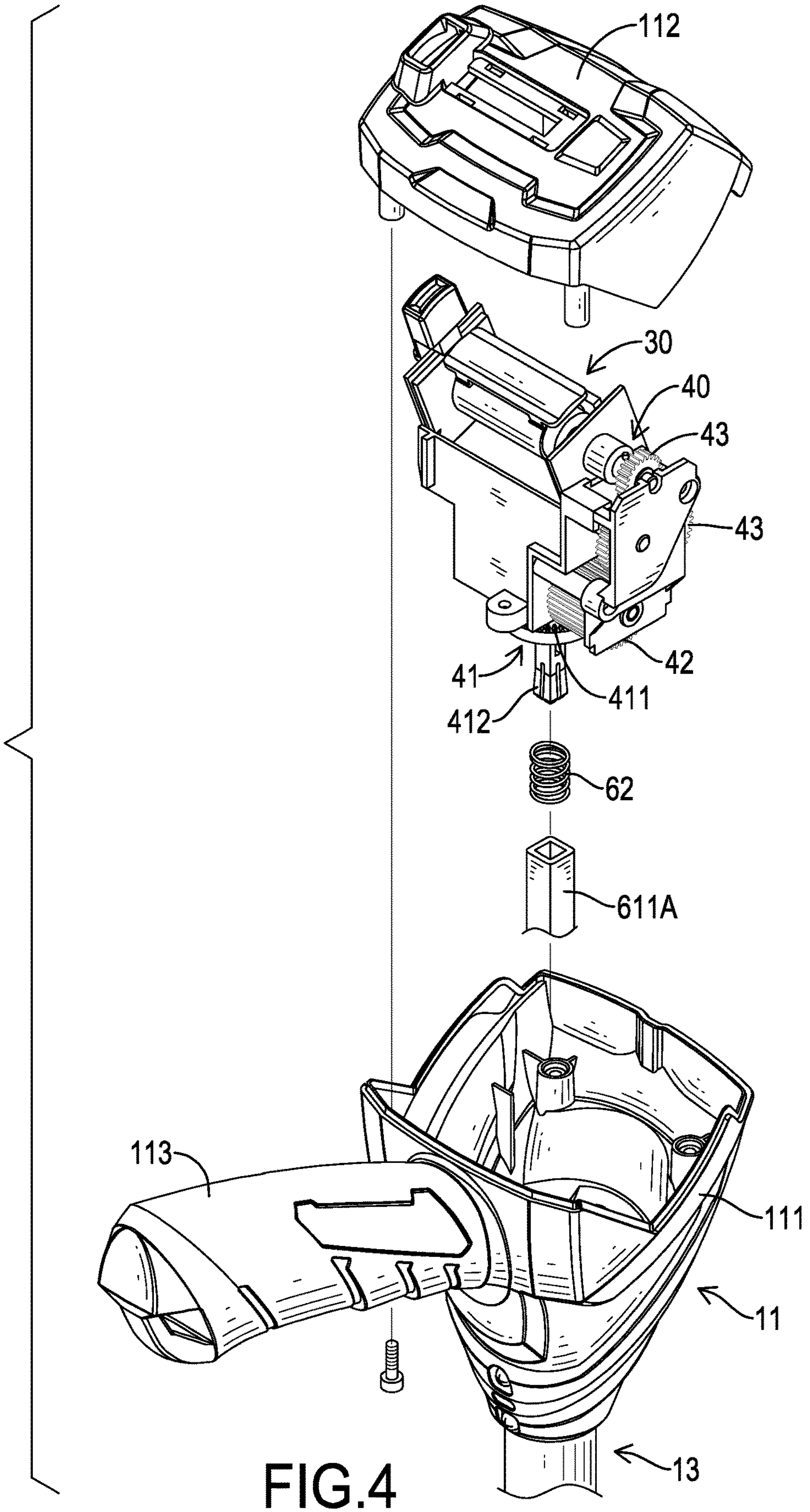
FIG. 4 is an enlarged exploded perspective view of a handle of the measuring wheel in FIG. 1.

With reference to FIGS. 1 and 2, the body 10 has a handle 11, a wheel fork 12, and an operating shaft 13. The handle 11 and the wheel fork 12 are respectively disposed on the top and the bottom of the body 10. In addition, the operating shaft 13 is connected to the handle 11 and the wheel fork 12. With reference to FIG. 2, the distance wheel 20 is rotatably disposed on the wheel fork 12, and the measuring module 30 is disposed on the handle 11. With reference to FIGS. 3 and 4, the handle 11 has a casing 111 and a cover 112. The casing 111 is hollow to receive the measuring module 30 and corresponding transmission components, and has a grip 113 formed on and protruded from an outer surface of the handle 11. The cover 112 is detachably connected to the casing 111 to cover an opening of the casing 111 that communicates with an interior of the casing 111.

With reference to FIGS. 1 and 2, the distance wheel 20 is rotatably connected to the wheel fork 12 of the body 10. In use of the measuring wheel of the present invention, a user holds the grip 113 of the handle 11 to contact the distance wheel 20 with the ground, and pushes the measuring wheel to move to rotate the distance wheel 20 along the ground. The upper transmission group 40, the lower transmission group 50, and the linking group 60 are disposed and transmitted between the distance wheel 20 and the measuring module 30. Then the user can obtain the distance that an outer circumference of the distance wheel moves along the ground via the measuring module 30, the features and structural relationships of the upper transmission group 40, the lower transmission group 50, and the linking group 60 will be described below.

Figure 6:
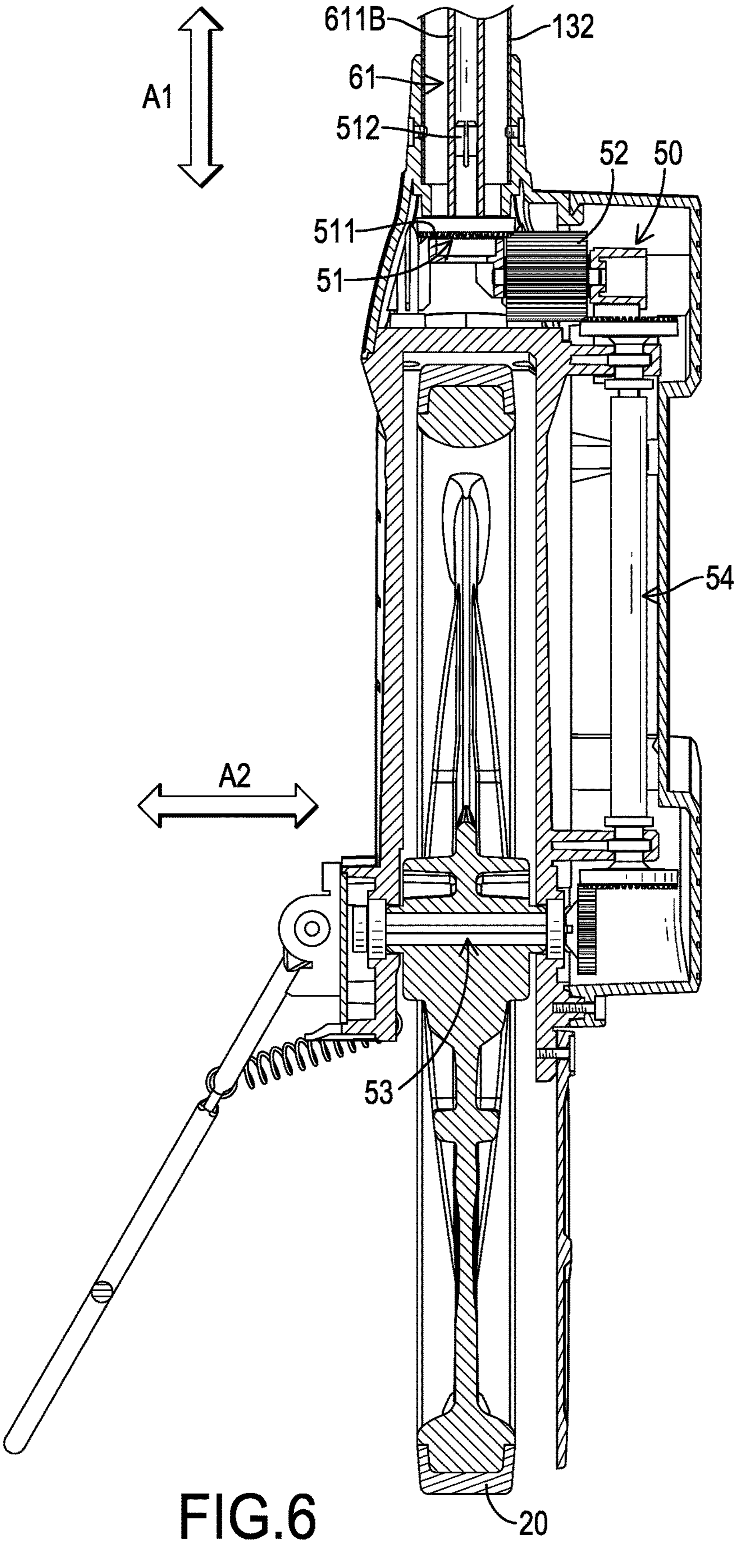
FIG. 6 is an enlarged side view in partial section of a lower transmission group of the measuring wheel in FIG. 1.

With reference to FIGS. 2, 3, and 6, the upper transmission group 40 is disposed in the handle 11 of the body 10 and is connected to the measuring module 30. The lower transmission group 50 is disposed in the wheel fork 12 and is connected to the distance wheel 20. The linking group 60 is disposed in the operating shaft 13 of the body 10 between the upper transmission group 40 and the lower transmission group 50, and is rotated in the operating shaft 13 to transmit between the upper transmission group 40 and the lower transmission group 50. In addition, the linking group 60 has a linking shaft 61, an upper connecting element 41, and a lower connecting element 51. The linking shaft 61 is connected to and rotated with the upper connecting element 41 and the lower connecting element 51, is connected to the upper transmission group 40 via the upper connecting element 41, and is connected to the lower transmission group via the lower connecting element 51.

Figure 5:
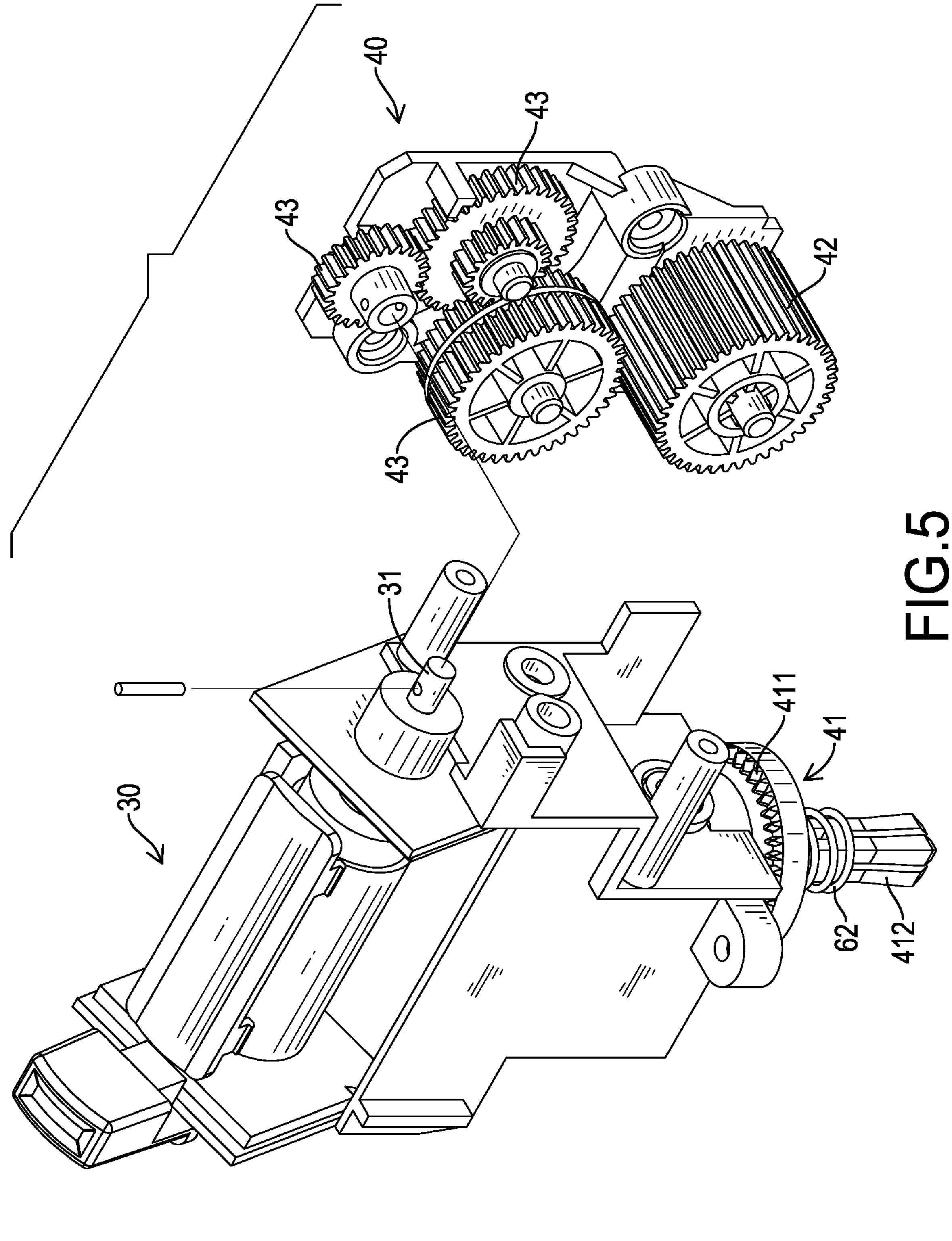
FIG. 5 is an enlarged exploded perspective view of the upper transmission group and a measuring module of the measuring wheel in FIG. 1.

With reference to FIGS. 3 to 5, the upper transmission group 40 has an upper engaging gear 42 engaging with the upper connecting element 41. Then the upper engaging gear 42 is rotated with the linking shaft 61 when the upper connecting element 41 is rotated with the linking shaft 61 to transmit the rotation energy of the linking shaft 61 to the upper transmission group 40. Furthermore, the upper connecting element 41 is disposed on the linking shaft 61 along an axial direction A1 of the linking shaft 61, and an axial center of the upper engaging gear 42 is disposed along a disposed direction D. The axial direction A1 of the linking shaft 61 is perpendicular to the disposed direction D. In addition, the upper connecting element 41 has a gear portion 411 and an engaging portion 412. The gear portion 411 of the upper connecting element 41 engages with the upper engaging gear 42. The engaging portion 412 is connected to the gear portion 411, is elastic, and is inserted into the linking shaft 61 and abuts against an inner wall of the linking shaft 61 to hold the upper connecting element 41 securely with the linking shaft 61.

With reference to FIGS. 3 to 5, in the present invention, the upper transmission group 40 has multiple transmission gears 43 disposed between the upper engaging gear 42 and the measuring module 30, and the transmission gears 43 sequentially engage with each other. One of the transmission gears 43 engages with the upper engaging gear 42, and another one of the transmission gears 43 is connected to and synchronously rotated with a rotating shaft 31 of the measuring module 30 that extends out of the measuring module 30. Then the rotation energy of the upper engaging gear 42 can transmit to the measuring module 30 via the rotating shaft 31.

In other embodiments, the upper transmission group 40 may have only one said transmission gear 43, and the said transmission gear 43 directly engages with the upper engaging gear 42 and is connected to the rotating shaft 31, or the upper engaging gear 42 is directly connected to the rotating shaft 31 without the said transmission gear 43. Furthermore, in the present invention, the transmission gears 43 and the upper engaging gear 42 are designed to be smaller in size to enable compacting configuration and to save space, and the volume of the handle 11 can also be designed to be smaller.

Figure 7:
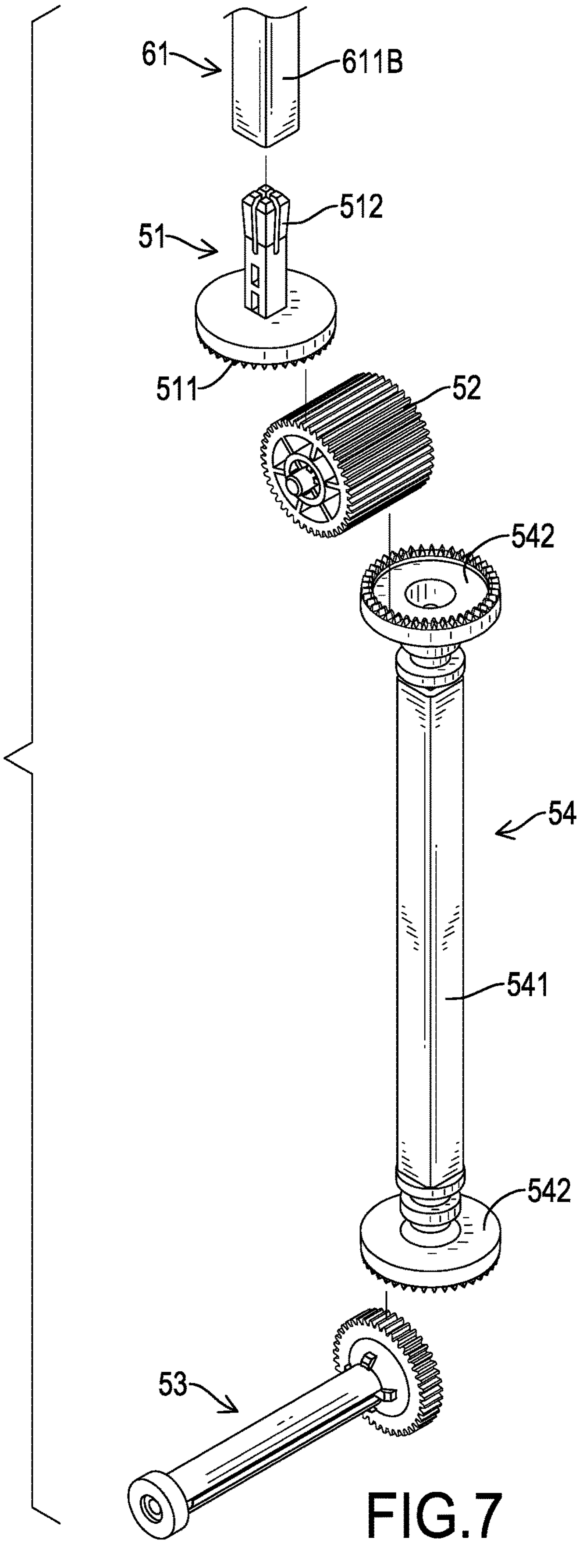
FIG. 7 is an enlarged exploded perspective view of the lower transmission group of the measuring wheel in FIG. 1.

With reference to FIGS. 6 and 7, the lower transmission group 50 has a lower engaging gear 52 engaging with the lower connecting element 51 of the linking group 60. Then the lower engaging gear 52 is rotated with the linking shaft 61 when the lower connecting element 51 is rotated with the linking shaft to transmit the rotation energy of the linking shaft 61 to the lower transmission group 50. Furthermore, the lower connecting element 51 has a structure similar to the structure of the upper connecting element 41, and has a gear portion 511 and an engaging portion 512. The lower connecting element 51 is disposed on the linking shaft 61 along the axial direction A1 of the linking shaft 61, and an axial center of the lower engaging gear 52 is disposed along an axial direction A2 of the distance wheel 20. The axial direction A1 of the linking shaft 61 is perpendicular to the axial direction A2 of the distance wheel 20. The gear portion 511 of the lower connecting element 51 engages with the lower engaging gear 52. The engaging portion 512 is connected to the gear portion 511, is elastic, and is inserted into the linking shaft 61 and abuts against the inner wall of the linking shaft 61 to hold the lower connecting element 51 securely with the linking shaft 61.

With reference to FIGS. 6 and 7, in the present invention, the lower transmission group 50 has an axle member 53 and a transmission shaft 54. The axle member 43 is disposed on an axial center of the distance wheel 20 along the axial direction A2 of the distance wheel 20 to synchronously rotate with the distance wheel 20. The lower engaging gear 52 is disposed along the axial direction A2 of the distance wheel 20 and is parallel with the axle member 53. The transmission shaft 54 is disposed along the axial direction A1 of the linking shaft 61 and has a lower end engaging with the axle member 53 and an upper end engaging with the lower engaging gear 52. When the distance wheel 20 is rotated, the axle member 53 is rotated with the distance wheel 20, the transmission shaft 54 and the lower engaging gear 52 are sequentially driven to rotate, and finally the rotation energy is transmitted to the linking shaft 61 via the lower connecting element 51.

With reference to FIG. 7, specifically, the transmission shaft 54 has a transmission tube 541 and two jointing elements 542. The two jointing elements are respectively inserted into two ends of the transmission tube 541 and respectively engage with the lower engaging gear 52 and the axle member 53. Then the rotation energy of the axle member 53 can be transmitted to the lower engaging gear 52 via the two jointing elements 542 and the transmission tube of the transmission shaft 54. In addition, the lower transmission group 50 may have multiple gears disposed and transmitted between the lower engaging gear 52 and the axle member 53, and numbers and configurations thereof are not limited in the present invention.

In use, the measuring wheel of the present invention is pushed by a user, the distance wheel 20 is rotated and its outer circumference is moved along the ground. Through the sequential transmission of the lower transmission group 50, the linking group 60, and the upper transmission group 40, the rotation energy of the wheel body 20 is transmitted from the wheel fork 12 to the measuring module that is disposed on the handle 11. Then the measuring module 30 obtains a movement data of the distance wheel 20, and the user can directly observe the measuring module 30 disposed on the handle 11 to obtain the movement data of the distance wheel 20 along the ground.

To be specific, the measuring module 30 may have a control unit, and the control unit contains a transmission conversion formula between the upper transmission group 40, the lower transmission group 50, and the linking group 60, for example, a diameter ratio of the axle member 53 and the distance wheel 20, a gear ration of the gear portion 511 and the lower engaging gear 52, and a gear ratio of the upper connecting element 41 and the gear portion 411, etc. Then the control unit of the measuring module 30 can calculate the distance of the distance wheel 20 moving along the ground through the rotation of the rotating shaft 31. The distance of the distance wheel 20 moving along the ground can be displayed on a screen of the measuring module 30 conveniently.

Furthermore, the sizes of gears of the upper transmission group 40, the lower transmission group 50, and the linking group 60 can be specifically designed so that the number of revolutions of the rotating shaft 31 is consistent with the number of revolutions of the distance wheel 20. The measuring module may have a revolution counter, and the number of revolutions of the rotating shaft 31 (that is, the number of revolutions of the distance wheel 20) can be obtained by using the revolution counter. Then combined with the diameter of the distance wheel 20, the distance that the distance wheel 20 moves along the ground can be calculated. The configuration of the measuring module 30 is not specifically limited in the present invention.

With reference to FIGS. 3 and 6, the linking group 60 may have an elastic element 62, and an elastic force of the elastic element 62 can enable the upper connecting element 41 and the lower connecting element 51 to respectively move toward and abut against the upper engaging gear 42 and the lower engaging gear 52. Furthermore, the elastic element 62 may be a compression spring, is disposed between the linking shaft 61 and the upper connecting element 41, and has two ends respectively abutted against a top end of the linking shaft 61 and the gear portion 411 of the upper connecting element 41. With reference to FIG. 3, the gear portion 411 of the upper connecting element 41 is pushed upwardly by the elastic element 62 to abut against the upper engaging gear 42 to engage with the upper engaging gear 42 stably. With reference to FIGS. and 6, the linking shaft 61 is pushed downwardly by the elastic element 62 to push the gear portion 511 of the lower connecting element 51 to stably engage with the lower engaging gear 52.

In the present invention, the elastic element 62 can also be a disk spring, a spring slice, or a structure made of an elastic material such as rubber, as long as the elastic member 62 can provide an elastic force to push the upper connecting element 41 and the lower connecting element 51 respectively toward the upper engaging gear 42 and the lower engaging gear 52, so that the upper connecting element 41 and the lower connecting element 51 can respectively and stably engage the upper engaging gear 42 and the lower engaging gear 52. The specific configuration of the elastic member 62 is not limited in the present invention.

Furthermore, the elastic element 62 may be disposed between the linking shaft 61 and the lower connecting element 51 to directly push the lower connecting element 51 to drive the linking shaft 61 to push against the upper connecting element 41. In addition, the elastic element 62 may be disposed on a middle of the linking shaft 61 as long as the elastic force of the elastic element 62 can push the upper connecting element 41 to move upwardly to abut against the upper engaging gear 42 and push the lower connecting element 51 to move downwardly to abut against the lower engaging gear 52. Then an effect of improving transmission accuracy and maintaining low measurement error can be achieved. Therefore, the position of the elastic member 62 is not limited in the present invention.

According to the above-mentioned features and structural relationships of the measuring wheel of the present invention, the measuring wheel includes the upper transmission group 40, the lower transmission group 50, and the linking group 60 to transmit the rotation energy of the distance wheel 20 to the measuring module 30 disposed on the handle 11 via the wheel fork 12. Then the user can see the movement data displayed by the measuring module 30 without squatting down and this is conveniently in use. Furthermore, the elastic force of the elastic member 62 can enable the upper connecting element 41 and the lower connecting element 51 to move respectively and directly toward the upper transmission gear 42 and the lower transmission gear 52, and this can prevent forming gaps between the upper connecting element 41 and the upper engaging gear 42 and the lower connecting element 51 and the lower engaging gear 52, even if the transmission mechanism is elongated due to the measuring module 30 being disposed on the handle 11, it can still be transmitted more accurately, thereby providing a measuring wheel that can be easily and conveniently read by the user and can maintain a low measurement error.

Figure 8:
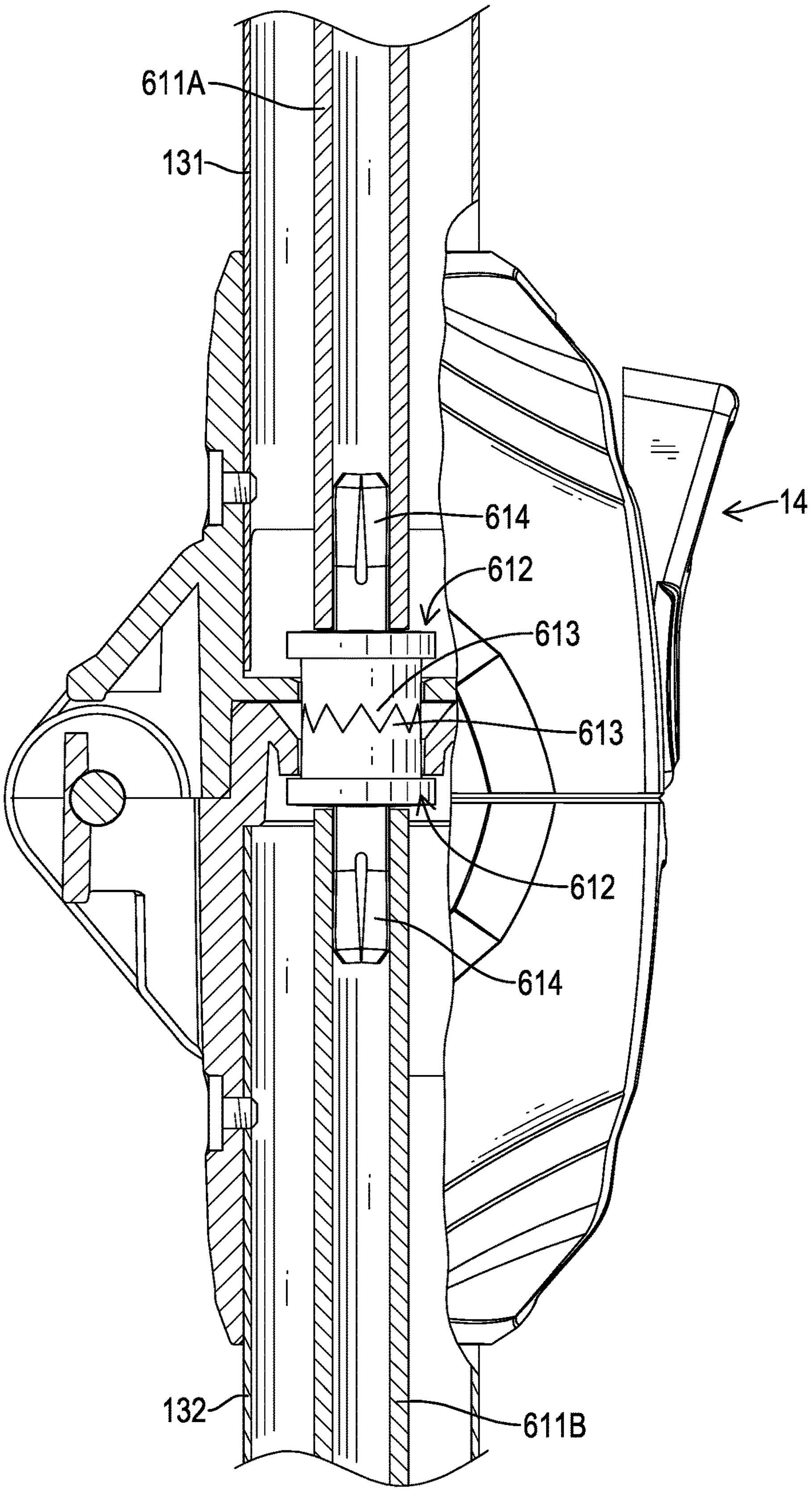
FIG. 8 is an enlarged side view in partial section of a linking group of the measuring wheel in FIG. 1.
Figure 9:
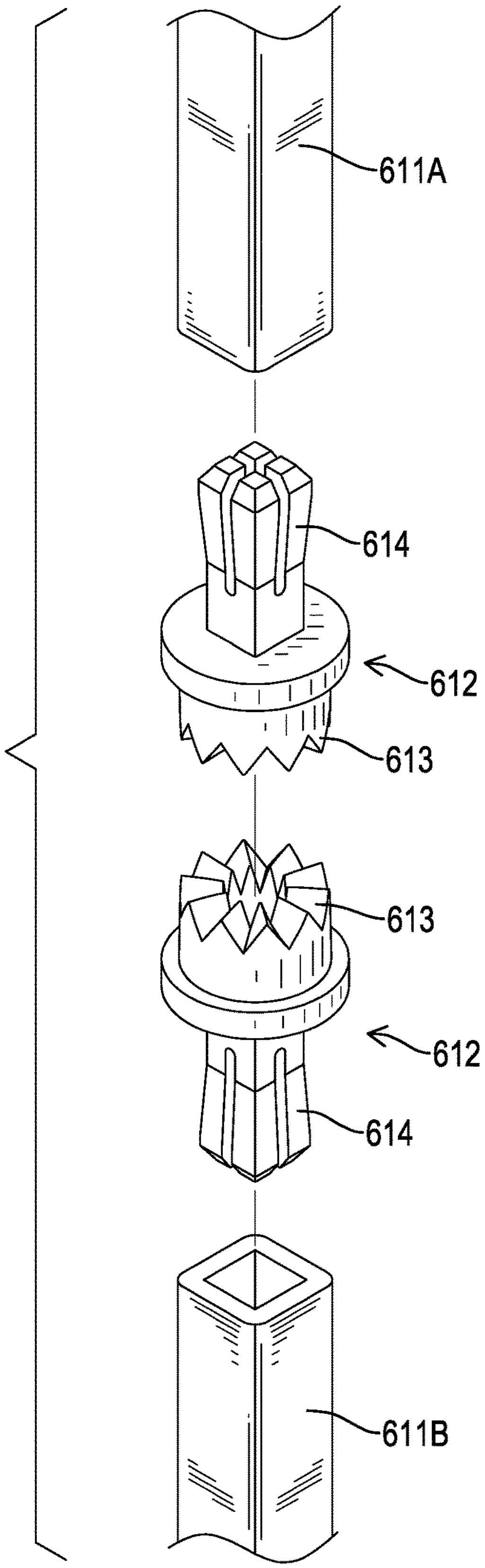
FIG. 9 is an enlarged exploded perspective view of the linking group of the measuring wheel in FIG. 1.
Figure 10:
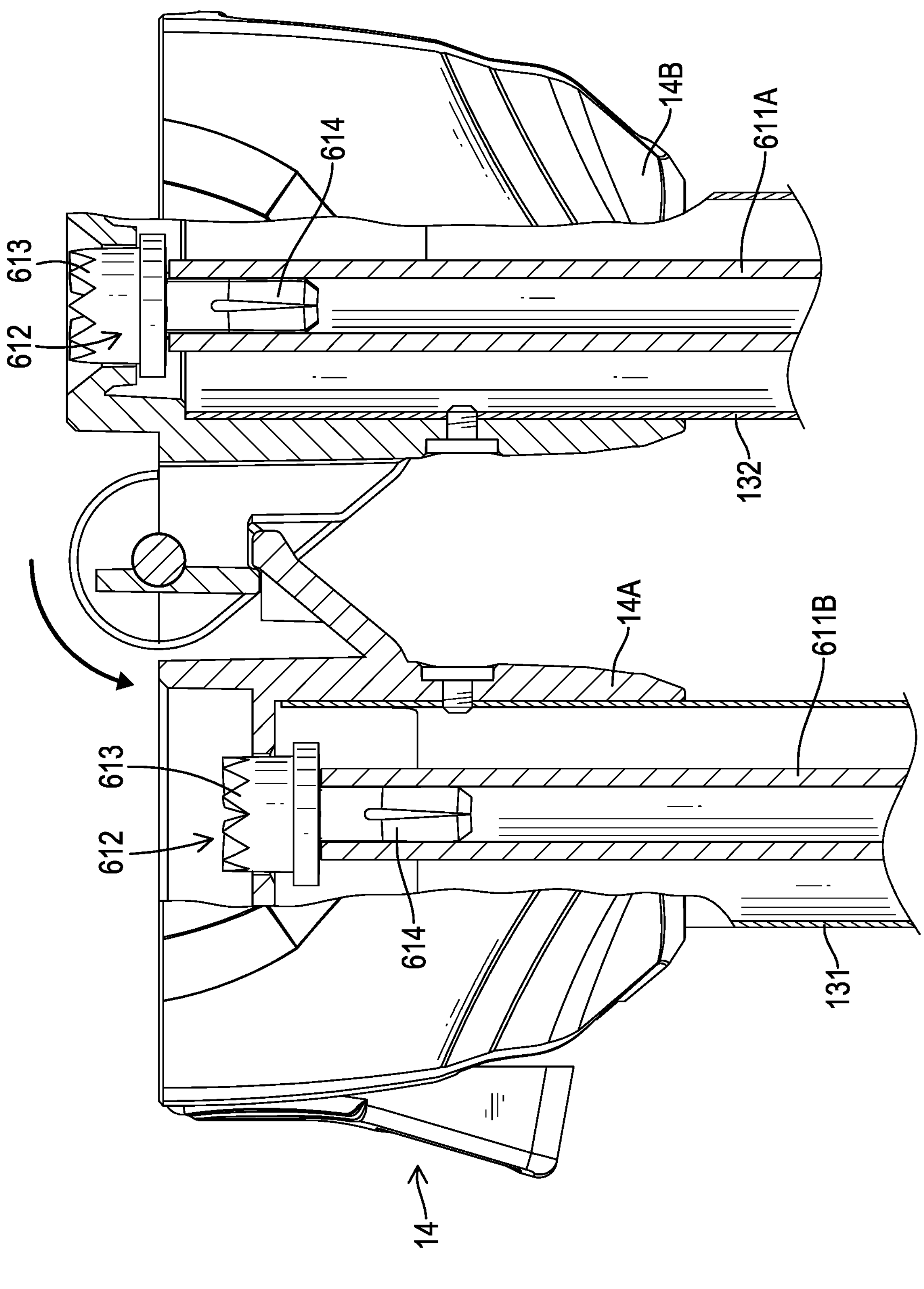
FIG. 10 is an operational side view in partial section of the linking group of the measuring wheel in FIG. 1.

With reference to FIGS. 8 to 10, the operating shaft 13 may have an upper pipe 131 and a lower pipe 132. The upper pipe 131 and the lower pipe 132 are connected to each other by a pivot device 14, and this enables the upper pipe 131 and the lower pipe 132 to swing relative to each other to fold or unfold. Furthermore, the linking shaft 61 has two shaft tubes 611A, 611B respectively disposed in the upper pipe 131 and the lower pipe 132, and the two shaft tubes 611A, 611B are detachably connected to and rotated with each other. When the upper pipe 131 and the lower pipe 132 are unfolded, the two shaft tubes 611A, 611B are connected and rotate synchronously, so that the linking shaft 61 can transmit the rotation energy normally. When the upper pipe 131 and the lower pipe 132 are folded, the two shaft tubes 611A, 611B are separated from each other and respectively swung with the upper pipe 131 and the lower pipe 132. Then the measuring wheel of the present invention can be folded to reduce the occupied space for storage.

With reference to FIGS. 8 to 10, specifically, the linking shaft 61 has two connectors 612, and each one of the two connectors 612 has an engaging end 613 and an inserting end 614. The engaging end 613 of the connector 612 has multiple engaging teeth arranged around the engaging end 613. The inserting end 614 of the connector 612 is connected to the engaging end 613. The inserting ends 614 of the two connectors 612 are respectively inserted into and abutted against the two shaft tubes 611A, 611B. The engaging ends 613 of the two connectors 612 are engaged with each other. When the upper pipe 131 and the lower pipe 132 are folded, the engaging ends 613 of the two connectors 612 are disengaged from each other by the relative swing of the upper pipe 131 and the lower pipe 132.

According to the above-mentioned features and structural relationships of the measuring wheel of the present invention, the present invention has the following advantages:

First, the measuring wheel has the upper transmission group 40, the lower transmission group 50, and the linking group 60 to transmit the rotation energy of the distance wheel 20 to the measuring group 30 disposed on the handle 11 via the wheel fork 12, and this enables a user to easily and conveniently see the movement data displayed by the measuring module 30 without squatting down.

Second, the elastic force of the elastic element 62 of the linking group 60 can enable the upper connecting element 41 and the lower connecting element 51 to respectively move toward and engage with the upper engaging gear 42 and the lower engaging gear 52, and this can prevent forming gaps between the upper connecting element 41 and the upper engaging gear 42 and the lower connecting element 51 and the lower engaging gear 52, even if the transmission mechanism is elongated due to the measuring module 30 disposed on the handle 11, it can still be transmitted accurately, thereby providing a measuring wheel that can be easily and conveniently read by the user and can maintain a low measurement error.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A measuring wheel having
a body having
a handle;
a wheel fork; and
an operating shaft having two ends respectively connected to the handle and the wheel fork;
a distance wheel rotatably disposed on the wheel fork of the body;
a measuring module disposed in the handle of the body;
an upper transmission group disposed in the handle of the body, connected to the measuring module, and having an upper engaging gear;
a lower transmission group disposed in the wheel fork of the body, connected to the distance wheel, and having a lower engaging gear; and
a linking group disposed in the operating shaft of the body and having
a linking shaft disposed in the operating shaft;
an upper connecting element connected to and synchronously rotated with the linking shaft, and having a gear portion engaging with the upper engaging gear;
a lower connecting element connected to and synchronously rotated with the linking shaft, and having a gear portion engaging with the lower engaging gear; and
an elastic element pushing the upper connecting element and the lower connecting element respectively toward and abutted against the upper engaging gear and the lower engaging gear;
wherein
the operating shaft has
an upper pipe; and
a lower pipe swingably connected to the upper pipe;
the linking shaft has
two shaft tubes respectively disposed in the upper pipe and the lower pipe to detachably connect with each other, to synchronously rotate with each other, and each one of the two shaft tubes has a polygonal cross section; and
two connectors respectively connected to the two shaft tubes, and each one of the two connectors has
an engaging end, and the engaging ends of the two connectors engaging with each other; and
an inserting end, the inserting ends of the two connectors respectively inserted into and abutted against the two shaft tubes of the linking shaft, and each one of the inserting ends having a cross section corresponding to the polygonal cross section of a responsive one of the two shaft tubes to prevent the two connectors from respectively rotating relative to the two shaft tubes;
the elastic element is a compression spring, is disposed between the linking shaft and the upper connecting element, and has two ends respectively toward and abutting against a top end of the linking shaft and the gear portion of the upper connecting element;

the gear portion of the upper connecting element is pushed upwardly by the elastic element to abut against and engage with the upper engaging gear stably;
the linking shaft is pushed downwardly by the elastic element to push the gear portion of the lower connecting element to stably engage with the lower engaging gear;
engagements between the gear portion of the upper connecting element, the upper engaging gear, the gear portion of the lower connecting element, and the lower engaging gear prevent forming gaps between the upper connecting element and the upper engaging gear and the lower connecting element and the lower engaging gear.

2. The measuring wheel as claimed in claim 1, wherein the upper connecting element has
an engaging portion coaxially connected to the gear portion, the engaging portion inserted into and abutted against the linking shaft.

3. The measuring wheel as claimed in claim 1, wherein the lower connecting element has
an engaging portion coaxially connected to the gear portion, the engaging portion inserted into and abutted against the linking shaft.

4. The measuring wheel as claimed in claim 1, wherein
the upper transmission group has multiple transmission gears sequentially engaging with each other;
the upper engaging gear engages with one of the multiple transmission gears; and
the measuring module has a rotating shaft engaging with and synchronously rotated with another one of the multiple transmission gears.

5. The measuring wheel as claimed in claim 2, wherein
the upper transmission group has multiple transmission gears sequentially engaging with each other;
the upper engaging gear engages with one of the multiple transmission gears; and
the measuring module has a rotating shaft engaging with and synchronously rotated with another one of the multiple transmission gears.

6. The measuring wheel as claimed in claim 3, wherein
the upper transmission group has multiple transmission gears sequentially engaging with each other;
the upper engaging gear engages with one of the multiple transmission gears; and
the measuring module has a rotating shaft engaging with and synchronously rotated with another one of the multiple transmission gears.

7. The measuring wheel as claimed in claim 1, wherein
the lower transmission group has
an axle member disposed on an axial center of the distance wheel along an axial direction of the distance wheel to synchronously rotate with the distance wheel; and
a transmission shaft disposed along an axial direction of the linking shaft and having a lower end engaging with the axle member and an upper end engaging with the lower engaging gear;
the lower engaging gear has an axial center disposed along the axial direction of the distance wheel; and
the axial direction of the linking shaft is perpendicular to the axial direction of the distance wheel.

8. The measuring wheel as claimed in claim 2, wherein
the lower transmission group has an axle member disposed on an axial center of the distance wheel along an axial direction of the distance wheel to synchronously rotate with the distance wheel; and a transmission shaft disposed along an axial direction of the linking shaft and having a lower end engaging with the axle member and an upper end engaging with the lower engaging gear;

the lower engaging gear has an axial center disposed along the axial direction of the distance wheel; and the axial direction of the linking shaft is perpendicular to the axial direction of the distance wheel.

9. The measuring wheel as claimed in claim 3, wherein the lower transmission group has an axle member disposed on an axial center of the distance wheel along an axial direction of the distance wheel to synchronously rotate with the distance wheel; and a transmission shaft disposed along an axial direction of the linking shaft and having a lower end engaging with the axle member and an upper end engaging with the lower engaging gear;

the lower engaging gear has an axial center disposed along the axial direction of the distance wheel; and the axial direction of the linking shaft is perpendicular to the axial direction of the distance wheel.

* * * * *